L. & L. R. BLEITZ.
SPEED VARYING AND REVERSING MECHANISM.
APPLICATION FILED AUG. 17, 1910.
997,486.
Patented July 11, 1911.
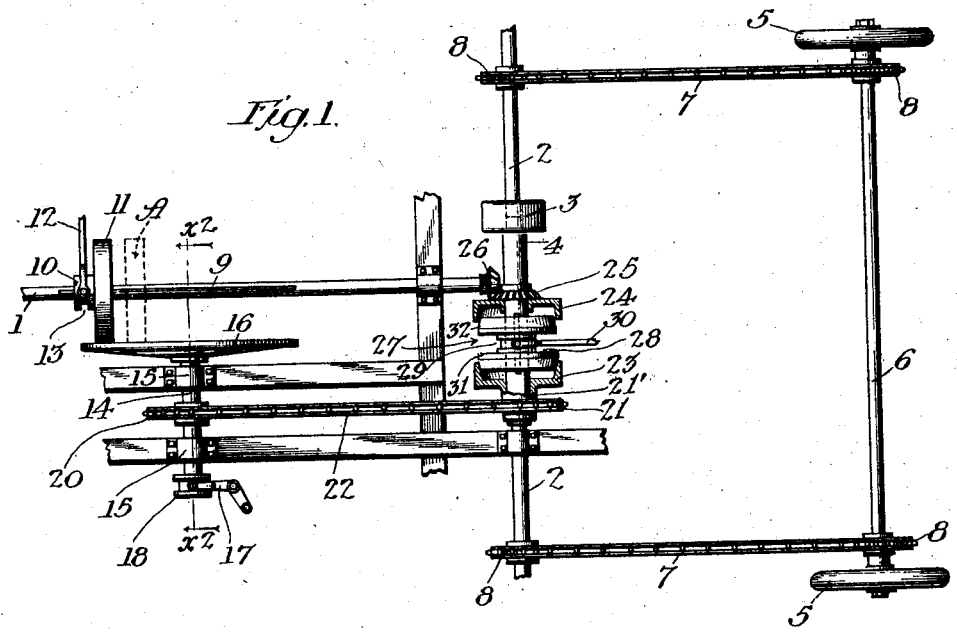
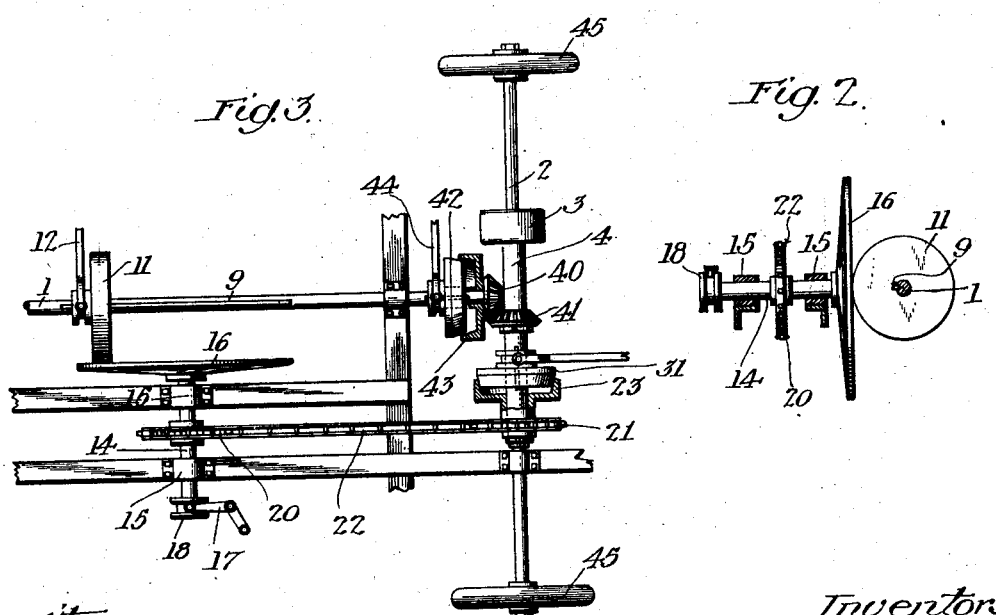
Witnesses:
Lute D. Alter
Clarence J. Williams
Inventors
Louis Bleitz
Louis Rollen Bleitz.
by Munn & Hackley
attys.
COLUMBIA PLANOGRAPH CO., WASHINGTON, D. C.

UNITED STATES PATENT OFFICE.

LOUIS BLEITZ AND LOUIS ROLLEN BLEITZ, OF LOS ANGELES, CALIFORNIA.

SPEED VARYING AND REVERSING MECHANISM.

997,486. Specification of Letters Patent. Patented July 11, 1911.

Application filed August 17, 1910. Serial No. 577,662.

*To all whom it may concern:*

Be it known that we, LOUIS BLEITZ and LOUIS ROLLEN BLEITZ, both citizens of the United States, residing at Los Angeles, in the county of Los Angeles and State of California, have invented a new and useful Speed Varying and Reversing Mechanism, of which the following is a specification.

In a previous application of ours, filed April 2, 1910, Serial No. 553,142, we have shown a device in which power may be transmitted from the driving or engine shaft to a driven shaft either through friction members or directly by means of a clutch.

The present invention shows a different form of device for accomplishing the same general purpose.

This invention relates to that type of speed varying and reversing mechanism in which two connections are made between the driving shaft and driven shaft, one by interposing a pair of friction disks therebetween and a positive connection between the driving shaft and driven shaft which may be safely placed in operative relation after the friction disks have been used to bring the speed of the driven shaft up to approximately the same speed as the driving shaft, and one of the main objects of the present invention is to produce a device of the class described which is particularly adapted to be used on a vehicle designed to carry heavy loads.

Another object of the present invention is to produce a device of the character described of simple and economical construction and which may be easily and simply operated or controlled.

Other objects and advantages will appear hereinafter as disclosed in the following description.

Referring to the drawings, which are for illustrative purposes only: Figure 1 is a plan view of a device embodying our invention applied to the rear wheels of an automobile. Fig. 2 is a sectional view on line $x^2$—$x^2$ Fig. 1. Fig. 3 is a view similar to Fig. 1 showing a modified form of the invention.

1 designates the engine or driving shaft of an automobile and 2 the driven shaft which in the present instance is divided and provided with a differential 3 having a sleeve 4.

5 designates the rear wheels of the automobile mounted on a shaft 6 driven from the shaft 2 by means of sprocket chains 7 running over sprockets 8.

The driving shaft 1 is provided with a spline 9 engaging a groove in the hub 10 of a friction driving disk 11 which rotates with the shaft 1 and is movable longitudinally along the shaft 1 by means of a lever 12 or other suitable mechanism, in engagement with an annular groove 13 formed in the hub 10.

Mounted on a shaft 14 in suitable bearings 15 at right angles to the friction driving disk 11 is a friction driven disk 16 which may be shifted longitudinally by means of a suitable lever 17 in engagement with a grooved collar 18. A sprocket wheel 20 is mounted on the shaft 14 for driving a sprocket wheel 21 on the sleeve 4 of the differential by means of a chain 22. The sprocket 21 is formed on an extension 21' of a clutch drum 23 loosely mounted on the sleeve 4 of the differential. 24 designates a similar clutch drum loose on the sleeve 4 and having formed integral therewith a bevel gear 25 which meshes with a bevel gear 26 on the end of the shaft 1. Splined to the sleeve 4 and slidable longitudinally thereon is a clutch member 27 having a central hub member 28 provided with an annular groove 29 for engagement with a suitable lever 30 or other suitable device to shift the member 27 along the sleeve 4. The clutch member 27 is provided with two cone friction members 31 and 32 adapted to engage drums 23 and 24 respectively, as hereinafter described. The driving disk 11 is of smaller diameter than the driven disk 16, so that, as illustrated in Fig. 1, with the driving disk 5 near the greatest diameter of the driven disk 16, the speed of the driven disk 16 is slower than the driving disk 11, which being on the engine shaft 1 moves at the same speed as the engine. The disk 16 on shaft 14 drives sprocket 20, chain 22, and sprocket 21. The sprocket being free on the sleeve 4 of the differential, imparts no movement thereto until by shifting the lever 30, the cone 31 is moved into engagement with the drum 23, thereby driving the shaft 2, through the differential, upon the sleeve of which the clutch member 27 is splined. By driving the shaft 2 in the manner just described, the shaft 2 is driven at a lower speed than the driving shaft 1, the sprockets 20 and 21 being of the same diameter.

To increase the speed of the shaft 2, the driving disk 11 is moved toward the center of the disk 16, giving a gradual increase of speed, and by moving the disk 11 into the dotted position "A" shown in Fig. 1, the shaft 2 will be driven at the same speed as the engine shaft 1, as the point where the diameter of contact of the disk 11 on the face of the disk 16 is equal to the diameter of the driving disk 11. At this point the lever 30 may be shifted, thereby throwing the cone 31 out of engagement with the drum 23 and the cone 32 into engagement with the drum 24 which clutches the shaft 1 to the shaft 2, thereby driving the shaft 2 through the medium of the sleeve 4 of the differential and the gears 25 and 26. The shaft 2, when the parts are in the position just described, is driven positively from the engine shaft at a speed dependent on the ratio of the gears 25, 26.

Having connected the two shafts positively through the toothed gearing, the friction disk 16 may be moved out of engagement with the driving disk 11 by means of lever 17 engaging the collar 18 to move the shaft 14 longitudinally away from the shaft 1.

If it is desired to run faster than engine speed, when the driving disk 11 reaches the dotted position "A", the operation of connecting the shafts 1 and 2 is not performed but the disk 11 is moved nearer the center of the disk 16 and a higher speed of the shaft 2 is attained through the friction disk 11 to disk 16 and the parts driven thereby, as heretofore described.

It is to be noted that by arranging the friction driving disk and friction driven disk as shown, that the device produces a low speed of the driven disk and hence most power when the driving disk is at the greatest diameter of the driven disk.

To reverse the drive, the disk 16 is moved out of engagement with the disk 11 and the latter disk moved across the center of disk 16 and the disk 16 moved into engagement with the disk 11, resulting in a reverse movement of the driven shaft through the medium of the transmission, heretofore described.

In the form shown in Fig. 3, the shaft 2 may be driven positively from the engine shaft 1 through a bevel gear 40 meshing with a bevel gear 41 which is fixed to the sleeve 4 of the differential. The gear 40 is loose on the shaft 1 and is clutched thereto by means of a clutch member 42 splined on the shaft 1 and movable longitudinally thereon into engagement with a clutch drum 43 formed on an extension on the gear 40, the clutch member being operated by means of a suitable lever 44. The friction driving mechanism in this form is the same as that shown in Figs. 1 and 2, and consists of a driving disk 11, driven disk 16 on shaft 14, sprockets 20 and 21, chain 22, and clutch drum 23 engaged by a clutch member 31 splined to the sleeve 4 of the differential, the operation of the friction driving mechanism being the same as that heretofore described in connection with Figs. 1 and 2.

Shaft 2 in the form shown in Fig. 3 is the rear axle of an automobile and has wheels 45 mounted thereon.

What we claim is:

1. In combination with a driving and driven shaft, a positive gear on each shaft in mesh with each other, one of said gears being loosely mounted on the shaft carrying said gear, a connection between said shafts including friction gearing comprising members relatively adjustable to vary the speed ratio of said shafts, whereby the driven shaft may be brought up to speed by the operation of the friction gearing, and means for placing the loosely mounted gear in fixed relation with its associated shaft.

2. A driving shaft, a bevel gear thereon, a friction disk adjustable on the driving shaft, a driven shaft at right angles to the driving shaft, a gear on the driven shaft meshing with the gear on the driving shaft, one of said gears being loosely mounted on the shaft carrying said gear, a shaft at right angles to the driving shaft, a disk thereon connected with the disk on the driving shaft, a connection from the last named shaft to the driven shaft, and means for placing the loosely mounted gear in fixed relation with its associated shaft.

In testimony whereof we have hereunto set our hands at Los Angeles, California, this 11th day of August, 1910.

LOUIS BLEITZ.
LOUIS ROLLEN BLEITZ.

In presence of—
 FRANK L. A. GRAHAM,
 P. H. SHELTON.